(12) United States Patent
Kamada et al.

(10) Patent No.: US 7,007,512 B2
(45) Date of Patent: Mar. 7, 2006

(54) METHOD FOR MACHINING GLASS SUBSTRATE

(75) Inventors: Kenji Kamada, Osaka (JP); Koji Ohta, Osaka (JP); Jun Yamaguchi, Osaka (JP); Tadashi Koyama, Osaka (JP)

(73) Assignees: National Institute of Advanced Industrial Science and Technology, Tokyo (JP); Nippon Sheet Glass Co., Ltd., Osaka (JP)

( * ) Notice: Subject to any disclaimer, the term of this patent is extended or adjusted under 35 U.S.C. 154(b) by 386 days.

(21) Appl. No.: 09/987,031

(22) Filed: Nov. 13, 2001

(65) Prior Publication Data

US 2002/0090493 A1  Jul. 11, 2002

(30) Foreign Application Priority Data

Nov. 17, 2000 (JP) .......................... P2000-350424

(51) Int. Cl.
*C03C 15/00* (2006.01)
(52) U.S. Cl. .............................. 65/61; 65/102; 216/97; 219/121.69
(58) Field of Classification Search ................. 65/105, 65/166, 174, DIG. 4, 61, 102, 106, 33.2, 65/392; 216/94, 97; 219/121.6, 121.67, 219/121.68, 121.69, 121.78; 385/39, 52, 385/137, 65, 83; 204/157.41; 428/426
See application file for complete search history.

(56) References Cited

U.S. PATENT DOCUMENTS

| 3,610,871 | A | * | 10/1971 | Lumley ................. 219/121.68 |
| 4,637,862 | A | * | 1/1987 | Eesley et al. ................ 205/109 |
| 5,425,118 | A | * | 6/1995 | Sugihara et al. ............... 385/51 |
| 5,961,852 | A | * | 10/1999 | Rafla-Yuan et al. ... 219/121.69 |
| 6,149,988 | A | * | 11/2000 | Shinohara et al. .......... 427/596 |
| 6,219,469 | B1 | * | 4/2001 | Minakata et al. ............... 385/2 |
| 6,333,485 | B1 | * | 12/2001 | Haight et al. .......... 219/121.68 |
| 6,379,777 | B1 | * | 4/2002 | Ota et al. .................... 428/156 |

FOREIGN PATENT DOCUMENTS

| EP | 0 936 022 | * | 8/1999 |
| JP | 08-062445 | * | 3/1996 |
| WO | WO 97/35811 | * | 10/1997 |

\* cited by examiner

*Primary Examiner*—Eric Hug
(74) *Attorney, Agent, or Firm*—Whitham, Curtis & Christofferson, PC

(57) ABSTRACT

In the present invention, a surface 7 of a glass substrate 1 is irradiated with a laser beam 2 to thereby form a V-shaped groove 6. At that time, the laser beam 2 is condensed outside and above the glass substrate 1. The distance between a beam-condensing point 4 of the laser beam 2 and the surface 7 of the glass substrate 1 is changed to thereby make it possible to change the angle between opposite side surfaces of the V-shaped groove. The angle is in a range of from 30 degrees to 120 degrees. Further, the laser beam used in the present invention is pulsed light, preferably with a pulse width not larger than 10 picoseconds.

12 Claims, 3 Drawing Sheets

V-SHAPED GROOVE

METHOD FOR MACHINING GLASS SUBSTRATE

BACKGROUND OF THE INVENTION

The present invention relates to a method for machining a glass substrate in which a groove-like concave portion is formed in a surface of the glass substrate, and particularly to a method for forming a V-shaped groove in the surface of the glass substrate by laser ablation.

A groove-like concave portion formed in a substrate is used as a member for retaining an optical device such as an optical fiber, a rod lens or the like, or as an optical device such as a diffraction grating or the like. When the groove formed in the substrate is used as a member for retaining an optical fiber or the like, it is important that a section of the groove perpendicular to a lengthwise direction of the groove is V-shaped. In the case where the groove section is U-shaped or rectangularly shaped, retention of the optical fiber or the like in the groove is performed not with line contact but with surface contact so that the size of the groove section is required to be coincident with the diameter of the optical fiber or the like with high accuracy. If the size of the groove section varies, the optical fiber or the like cannot be fixed into the groove surely so that the optical fiber or the like is moved inside the groove. Because the retention of the optical fiber or the like is performed for the purpose of aligning the optical axis of the optical fiber with that of another optical device, such movement causes a problem. On the other hand, in the case where the groove is V-shaped, the groove section is inclined linearly so that the optical fiber or the like can be retained with line contact between the opposite wall surfaces. Accordingly, there is no fear that the optical fiber or the like may be moved inside the groove.

Most of the V-shaped grooves used for the above-mentioned purpose are formed by chemical etching. The speed of etching varies in accordance with crystal orientation of the crystalline substrate such a silicon substrate or the like. When, for example, single crystal silicon is etched with an alkaline etching solution, the etching speed for a face (100) or a face (110) is higher than that for a face (111) so that a shape constituted only by a (111) crystal face can be formed (e.g. see "LSI Handbook", Institute of Electronics and Communication Engineers of Japan, the OHM sha Ltd.)

Such an etching method is called anisotropic etching. For anisotropic etching of the silicon crystal face, there may be used an alkaline solution such as KOH, $N_2H_4$ (hydrazine), $NH_2(CH_2)_2NH_2$ (ethylenediamine), $NH_4OH$ (aqueous ammonia), or the like. Si may be removed in the form of $SiO_2(OH)_2^-$ with $OH^-$ ions in the alkaline solution. Alcohol such as $CH_3.CHOH.CH_3$, $C_6H_4(OH)_2$ (pyrocatechol) or the like is often used as a buffer. It is considered that the buffer prevents $OH^-$ ions from being adsorbed onto the Si surface, reduces the etching speed easily controllably and changes plane-azimuth dependence.

When an Si (100) wafer surface is etched with the aforementioned etching solution in the condition that a mask such as a photo resist or the like having apertures of stripe-like patterns each having a constant width is provided on the Si (100) wafer surface, V-shaped grooves are formed. Etching is advanced while an angle between opposite side surfaces of each of the V-shaped grooves is kept at 54.7 degrees. The reaction substantially stops at a depth determined by a pattern width of the mask.

Because a crystallographically determined shape can be formed according to anisotropic etching, accurate machining can be performed compared with any background-art method. According to this anisotropic etching method, a V-shaped groove having any size can be formed by simply changing the pattern width. In addition, the method is an etching process in which a large quantity of grooves can be formed simultaneously. Hence, the method is advantageous in low cost of production when a large quantity of grooves each having the same shape are produced.

The method using anisotropic etching is, however, applicable only to a crystalline substrate such as a single-crystalline silicon substrate or the like as the material of the substrate. Further, in the method, the angle of the V-shape is determined crystallographically uniquely, so that the angle cannot be adjusted. These facts cause the following problem.

The higher performance is required of the optical device, the more serious problem is characteristic variation owing to the temperature of an optical system. This problem is caused by the expansion/contraction of each of optical devices constituting an optical system in accordance with the change of the temperature and is caused by the change of the optical path length in accordance with the change of the refractive index. Therefore, if a material having characteristic to cancel the change of the optical length of the optical device in accordance with the temperature change is used as the retaining member, the temperature change can be reduced on the whole of the optical system.

In the case of the retaining member used for aligning the optical axes of optical devices, the change of the temperature has influence on optical axis displacement due to expansion/contraction. On this occasion, a material having small expansion/contraction with respect to the temperature change may be used. For example, the thermal expansion coefficient of silicon is, however, about $25 \times 10^{-7 \circ} C.^{-1}$, so that it is difficult to select a material small in expansion/contraction from the aforementioned crystal materials used for anisotropic etching. On the contrary, materials small in thermal expansion coefficient such as quartz glass ($5.5 \times 10^{-7 \circ} C.^{-1}$) are present as glass materials. Further, a material called zero-thermal-expansion glass is known as a material having a thermal expansion coefficient smaller than that of quartz glass. In addition, in the case where an optical device on the retaining member has a positive thermal expansion coefficient, glass having a negative thermal expansion coefficient may be selected as the material for the retaining member so that the glass can cancel the thermal expansion of the whole system. As described above, as a retaining member which suppresses the change in characteristic of the optical device owing to the change of the temperature, a glass material which is an amorphous material can be selected in a wider selection range than that of a crystal material.

As the method for forming the V-shaped groove in the glass substrate, cutting by a dicing saw may be used. In this method, the substrate is cut while a blade finished accurately is rotated at a high speed. Accordingly, this method is applicable to a wide range of substrate materials, and has a feature that the angle of the V-shape and the width and depth of the groove can be changed desirably by exchanging the blade edge.

In the method of cutting by a dicing saw, however, the blade edge used for cutting wears out so quickly that one blade edge can form only several V-shaped grooves. Therefore, there occurs a cost problem. Further, because the blade edge needs to be exchanged into a new one whenever every several grooves are cut, it is difficult to keep the interval between adjacent grooves with high dimensional accuracy. In addition, because the size allowed to machine the blade edge is not small than 50 μm, there is a problem that the width of the V-shaped groove obtained thus is limited to be not small than 50 μm.

SUMMARY OF THE INVENTION

An object of the present invention is to solve the above problems in the method for forming a V-shaped groove in a surface of a glass substrate. Further, the present invention provides a method for machining a glass substrate wherein an angle between opposite side surfaces of the V-shaped groove can be changed desirably.

The method for machining a glass substrate according to the present invention is a method for forming a concave portion in a surface of the glass substrate by laser beam irradiation. In the method according to the present invention, the surface of the glass substrate to be machined is irradiated with a laser beam from above the glass substrate. The laser beam is condensed into a portion outside and, preferably, above the glass substrate. The method according to the present invention further has means for changing a distance between a beam-condensing point of the laser beam and the surface of the glass substrate. Further, the beam-condensing point of the laser beam is moved relative to the substrate and in parallel to the substrate surface, so that the groove-like concave portion can be formed in the surface of the substrate. Preferably, the laser beam is pulsed light having a pulse width not larger than 10 picoseconds.

A V-shaped groove formed in a surface of a glass substrate by a method for machining the glass substrate according to the present invention is provided so that an angle between opposite side surfaces of the V-shaped groove can change in a range of from 30 degrees to 120 degrees. Further, the glass substrate in which the V-shaped groove is provided so that the groove is formed by ablation using laser light. Hence, continuous machining can be performed even in the case where a large quantity of grooves are formed. As a result, accuracy in the interval between adjacent grooves can be improved easily and continuous machining can be performed.

The present disclosure relates to the subject matter contained in Japanese patent application No. 2000-350424 (filed on Nov. 17, 2000), which is expressly incorporated herein by reference in its entirety.

DESCRIPTION OF THE PREFERRED EMBODIMENT

An embodiment of the present invention will be described below.

Figure 3:
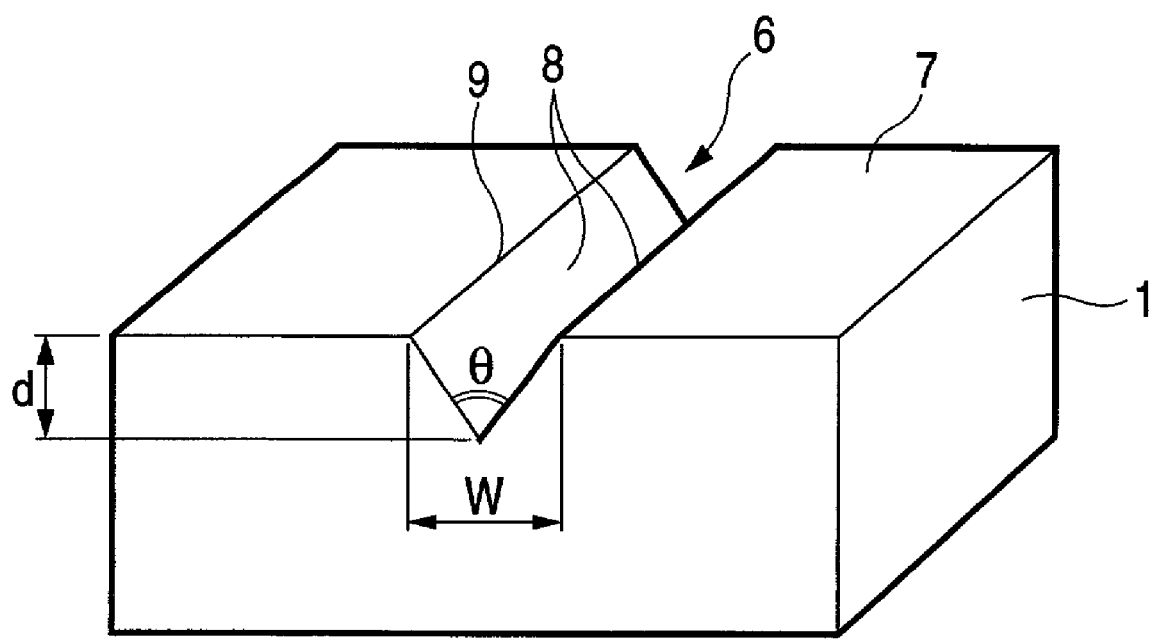
FIG. 3 is a perspective view showing a schematic shape of the V-shaped groove formed in a surface of the glass substrate.

A method for machining a V-shaped groove in a surface of a glass substrate according to the present invention is based on the fact that a laser beam is applied onto a glass surface to generate ablation in the glass surface. FIG. 3 shows a schematic shape of the V-shaped groove 6 formed thus. As the laser beam, it is desirably used laser light short in pulse width in order to smoothen groove side surfaces 8 of the groove machined by ablation and smoothen edges 9 formed between the groove side surfaces and the surface of the substrate. In the case where the laser beam is continuous light or light long in pulse width, good machining cannot be done because the edges 9 and their circumferences in the groove portion machined by ablation are deformed because of the influence of heat generated in laser beam irradiation. When, for example, such machining is performed by a pulsed laser having a pulse width of one nanosecond, cracks, elevations (debris) are often generated in the portion of the edges 9 of the groove so that a good V-shaped groove cannot be obtained. The shorter the pulse width of the laser becomes, the more instantaneously heat is generated at the time of laser pulse irradiation. Accordingly, conduction of the heat to the surrounding is reduced and a machined groove 6 having good side surfaces 8 and good edges 9 can be obtained. Accordingly, the pulse width of the laser beam is preferably not larger than 10 picoseconds and more preferably not larger than one picosecond. The smaller the pulse width is, the better it is. The smallest pulse width required for the stable oscillation of the laser is not smaller than about 10 femtoseconds.

The laser beam is condensed by a beam-condensing unit such as a lens or the like. On this occasion, if a beam-condensing point is adjusted to be located outside the glass material, a V-shaped groove can be formed. If the beam-condensing point of the laser beam is located on the glass surface, the groove cannot be V-shaped so that there occurs a problem such as cracks generated in the lower portion of the groove, or the like. When the beam-condensing point of the laser beam is moved from the glass surface so as to be located outside the glass, a V-shaped groove having smooth groove side surface edges without any cracks can be formed in the glass surface.

As to the above description, presumption is made as follows. A laser with a small pulse width has large peak power because energy is concentrated in a short pulse time. The peak power is expressed as a value of a peak output (W) per unit irradiated area, in which the peak output (W) is expressed as a ratio of output energy (J) per pulse to the pulse width (second). When such laser light with a small pulse width is condensed, the energy at the beam-condensing point becomes very large. If the peak power at the beam-condensing point becomes not smaller than $8 \times 10^{11}$ W/cm$^2$, the laser beam generates a self-converging effect to suppress the spread of the beam in the rear of the beam-condensing point (in a direction of movement of the laser) (See Oyo Butsuri, Vol. 67, p. 1051, 1998). In such a manner, the beam spread has a distribution adapted for machining a V-shaped groove in the glass. Accordingly, when the glass surface is disposed in the rear of the beam-condensing point (the direction of movement of the laser), a V-shaped groove can be formed in the glass surface.

The distance between the beam-condensing point and the glass surface machined by ablation is adjusted to be optimized in accordance with the combination of intensity of the laser beam, multiplying power and numerical aperture (NA) of the lens used, machining speed, and so on. In the case where these parameters are constant, the angle forming the V-shape can be changed desirably with the groove width of the V-shaped groove kept substantially constant when the distance between the beam-condensing point and the glass surface is changed. If the beam-condensing point is too close to the glass surface, cracks are, however, generated in the groove formed. On the other hand, if the beam-condensing point is too far from the glass surface, the energy distribution required for machining the V-shaped groove cannot be obtained so that there is a problem that the V-shaped groove cannot be obtained. Accordingly, the angle forming the V-shape of the V-shaped groove obtained by adjustment of the distance between the beam-condensing point and the glass surface is set to be in a range of from 30 degrees to 120 degrees.

The groove width of the V-shaped groove obtained by laser ablation can be changed desirably on the basis of the intensity of the laser beam and multiplying power and numerical aperture (NA) of the lens used. If the peak power at the beam-condensing point is too small, the effect of suppressing the beam spread in the rear of the beam-condensing point is too small because of the self-converging effect. Accordingly, the V-shaped groove cannot be formed in the glass surface by ablation.

When the beam-condensing point is moved relatively in parallel to the surface of the glass substrate, the V-shaped groove can be formed in the glass surface. Specifically, when the glass substrate is continuously moved relative to the beam-condensing point of the laser beam or the beam-condensing point of the laser beam outside the glass substrate is continuously moved in parallel to the glass surface, the beam-condensing point can be moved relatively.

As described above, a pulsed laser with a short pulse width is desirably used to make the peak power of the laser beam high to thereby obtain smooth side surfaces and smooth edges of a V-shaped groove. The lower the oscillation frequency of the laser is, the higher the peak power is made easily. If the oscillation frequency of the laser is too low, it is however impossible to form a smooth groove shape. Accordingly, the repetitive frequency of the laser pulse is set to be not lower than 100 Hz, preferably not lower than 500 Hz.

Although the laser output per se may be changed to change the intensity of the laser beam, it is preferable that the intensity of the laser beam is changed outside the laser oscillator because the oscillation of the laser may becomes unstable when the laser output per se is changed. Changing the laser beam externally can be achieved by disposing a device for changing the intensity of the laser light in the middle of the optical path of the laser beam. Specific examples of the device for changing the intensity may include an ND filter, a Glan-laser prism, and so on.

Although the present invention will be described below more specifically by citing embodiments, the present invention is not limited to the following embodiments without departing from the gist of the present invention. For example, a concave portion shaped like a conical hole may be formed without moving the irradiation position of the laser beam in a plane of the substrate. Further, if the distance between the beam-condensing point and the substrate surface is changed while the beam-condensing point and the substrate are moved relative to each other, a groove shape changeable in the angle between opposite side surfaces of the groove in accordance with the irradiated position can be formed.

[Embodiment 1]

Figure 1:
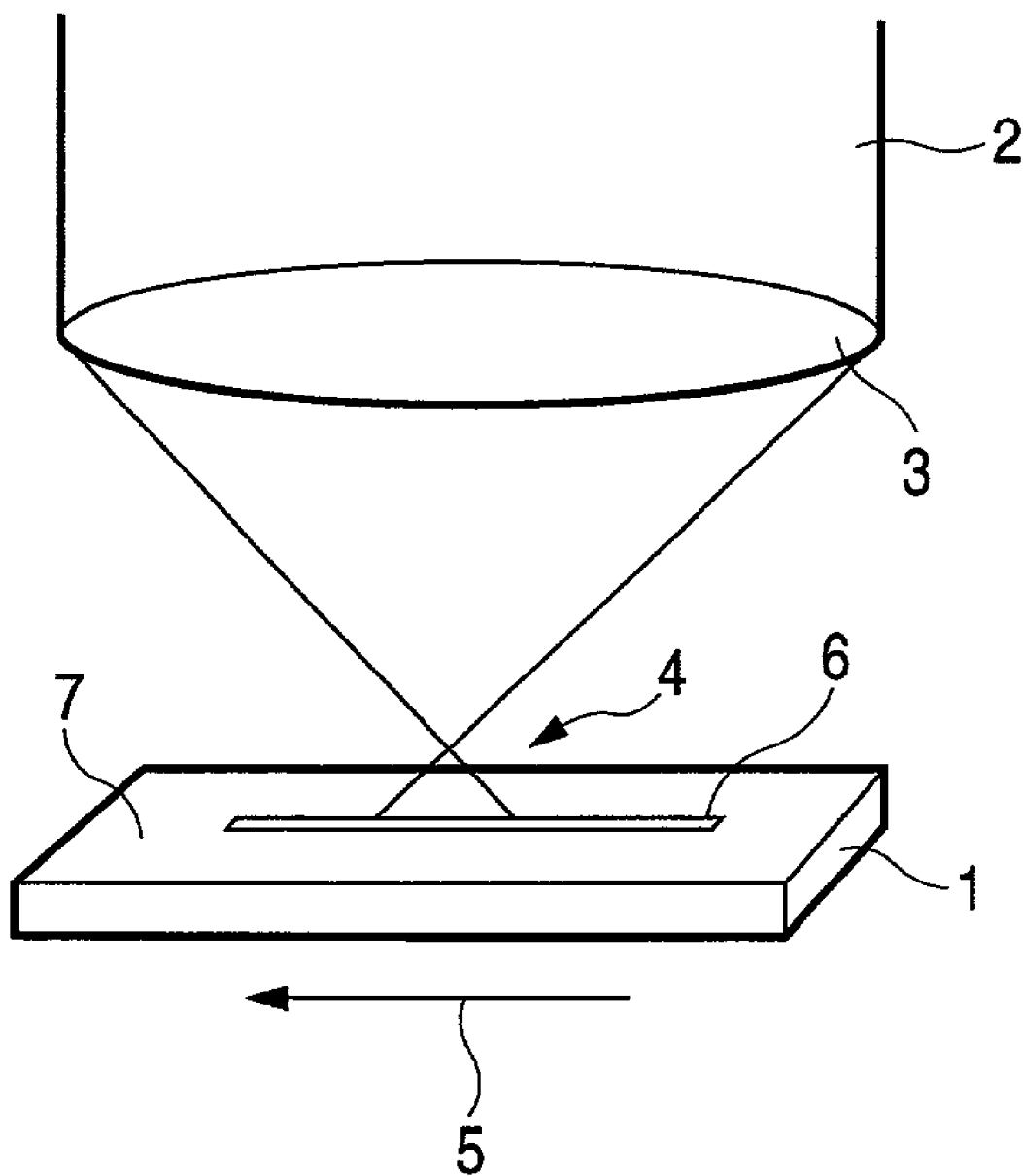
FIG. 1 is a view of schematic arrangement showing a method for machining a glass substrate according to the present invention.

A plate-like glass substrate having a composition shown in Table 1, having a value of $89.2 \times 10^{-7}$ °C.$^{-1}$ as a mean thermal expansion coefficient at a temperature of 0° C. to 300° C. and having a size of 20 mm×30 mm×2 mm was irradiated with a pulsed laser beam 2 condensed by a lens 3 as shown in FIG. 1. As the pulsed laser beam 2, there was used a laser beam which had a pulse width of 100 femtoseconds, a repetition frequency of 1 kHz, a wavelength of 800 nm and a mean output of 950 mW and which was oscillated by an argon-laser-excited titanium-sapphire (Ti: $Al_2O_3$) laser (not shown). After the laser beam was transmitted through an ND filter so as to be adjusted to have 500 mW intensity, the laser beam was condensed by a ten-fold objective lens 3 with a numerical aperture (NA) of 0.3 and the focal position 4 of the laser beam 2 was adjusted so as to be located far by 150 μm outside and above a surface 7 of the substrate 1. A V-shaped groove 6 was formed while the substrate 1 was moved in a direction of the arrow 5 at a speed of 100 μm/s.

Figure 2A:
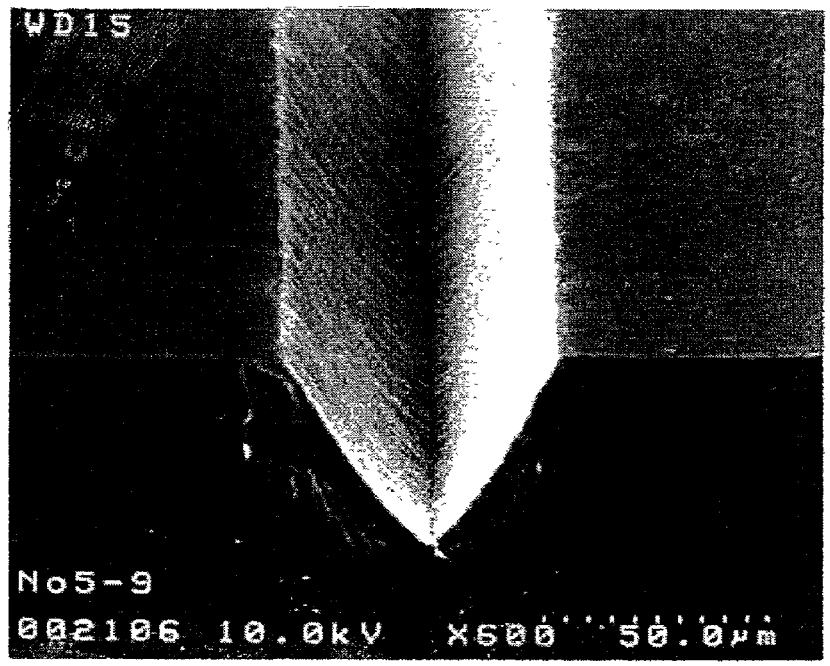
FIG. 2A is a scanning electron microscope photograph of a V-shaped groove formed according to Embodiment 1.
Figure 2B:
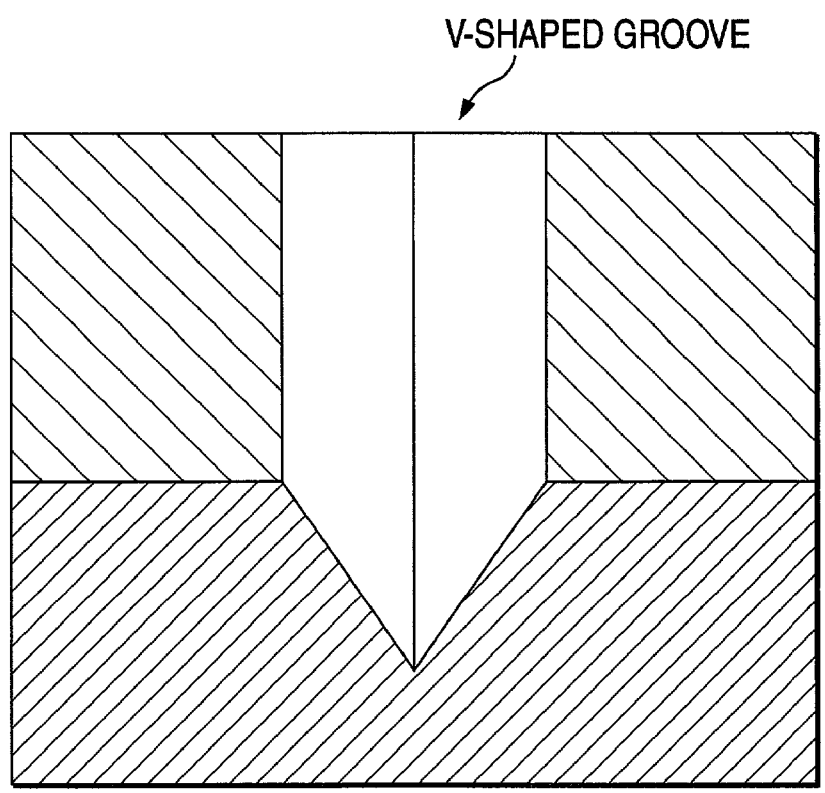
FIG. 2B is a schematic illustration thereof.

A scanning electron microscope photograph of the V-shaped groove formed in the above method was shown in FIG. 2A. Measurement results of the dimensions of the respective portions of the V-shaped groove shown in FIG. 3 were as follows. The groove width W was 51 μm, the depth d of the groove was 32 μm, and the angle θ between side surfaces 8 of the V-shaped groove was 77 degrees.

[Embodiment 2]

A V-shaped groove was produced by use of the same substrate material and the same laser beam source as those used in Embodiment 1 except that the focal position of the laser was changed so as to be located far by 125 μm outside and above the surface 7 of the substrate 1.

When the shape of the V-shaped groove formed was confirmed by a scanning electron microscope, the groove width W was 49 μm, the depth d was 67 μm, and the angle θ between the side surfaces 8 of the V-shaped groove was 40 degrees.

[Embodiment 3]

A V-shaped groove was produced by use of the same substrate material and the same laser beam source as those used in Embodiment 1 except that the focal position of the laser was changed so as to be located far by 175 μm outside and above the surface 7 of the substrate 1.

When the shape of the V-shaped groove formed was confirmed by a scanning electron microscope, the groove width W was 53 μm, the depth d was 19 μm, and the angle θ between the side surfaces 8 of the V-shaped groove was 110 degrees.

[Embodiment 4]

A plate-like substrate having a composition different from that in each of Embodiments 1 through 3 as shown in Table 1, having a value of $-4.1 \times 10^{-7}$ °C.$^{-1}$ as a mean thermal expansion coefficient at a temperature of −50° C. to 125° C. and having a size of 20 mm×30 mm×2 mm was irradiated with a pulsed laser beam 2 condensed by a lens 3 as shown in FIG. 1. As the pulsed laser beam 2, there was used a laser beam which had a pulse width of 100 femtoseconds, a repetition frequency of 1 kHz, a wavelength of 800 nm and a mean output of 950 mW and which was oscillated by an argon-laser-excited Ti:$Al_2O_3$ laser in the same manner as in Embodiment 1. After the laser beam was transmitted through an ND filter so as to be adjusted to have 740 mW intensity, the laser beam was condensed by a four-fold objective lens 3 with a numerical aperture (NA) of 0.13 and the focal position 4 of the laser beam 2 was adjusted to be located far by 450 μm outside and above the surface 7 of the substrate 1. A V-shaped groove 6 was produced while the substrate 1 was moved in a direction of the arrow 5 at a speed of 100 μm/s.

When the shape of the V-shaped groove produced by the above method was confirmed by a scanning electron microscope, the groove width W was 87 μm, the depth d was 58

μm, and the angle θ between the side surfaces 8 of the V-shaped groove was 74 degrees.

TABLE 1

| Mol % | Embodiments 1 to 3 | Embodiment 4 |
|---|---|---|
| $SiO_2$ | 70.9 | 70.6 |
| $Al_2O_3$ | 2.5 | 14.0 |
| $P_2O_2$ | | 0.7 |
| $Li_2O$ | | 9.3 |
| $K_2O$ | 1.2 | |
| $Na_2O$ | 13.9 | 1.6 |
| CaO | 8.3 | |
| MgO | 2.5 | 1.0 |
| $TiO_2$ | | 1.6 |
| $ZrO_2$ | | 1.2 |
| $SO_3$ | 0.4 | |
| $Fe_2O_3$ | 0.3 | |
| Expansion coefficient ($\times 10^{-7}/°$ C.) | 89.2 | -4.1 |

[Effect of the Invention]

As described above, according to the present invention, a pulsed laser beam with a short pulse width is condensed outside glass and a glass surface is located in the rear of a beam-condensing point of the laser beam (in the direction of movement of the laser beam) to thereby generate ablation in the glass surface. In such a manner, a V-shaped groove is formed in the surface of the glass substrate. When the distance between the focal position and the glass surface is changed, the angle between opposite side surfaces of the V-shaped groove can be changed. Because machining is performed by use of a laser, V-shaped grooves can be formed continuously, and accuracy in the interval between adjacent grooves can be improved easily in the case where a large number of grooves are formed.

What is claimed is:

1. A method for machining a glass substrate, comprising the step of:

forming a V-shaped groove in a glass surface of a glass substrate, by irradiating said glass surface of said glass substrate to be machined with a laser beam from above said glass substrate in a state that said laser beam is condensed at a point outside of said glass substrate.

2. The method according to claim 1, wherein, in said state laser beam is condensed at a point outside and above said glass substrate.

3. The method according to claim 1, further comprising the step of:

changing a distance between a beam-condensing point of said laser beam and said surface of said glass substrate.

4. The method according to claim 1, further comprising the step of:

moving where said laser beam is condensed relatively in a direction parallel to said surface of said glass substrate.

5. The method according to claim 1, wherein said laser beam is pulsed light having a pulse width not larger than 10 picoseconds.

6. The method of claim 1, wherein an angle of from 30 degrees to 120 degrees is formed between opposite side surfaces of said V-shaped groove; the V-shaped groove having a groove width in a range of 49–87 μm and groove depth in a range of 19–67 μm.

7. The method of claim 1, wherein the glass substrate has dimensions of about 20 mm×30 mm×2 mm.

8. The method of claim 1, wherein the V-shaped groove has a groove width in a range of 49–87 μm and a groove depth in a range of 19–67 μm.

9. The method of claim 1, the V-shaped groove having respective side surfaces with an angle θ between side surfaces in a range of 30–120 degrees.

10. A method for machining a glass substrate, comprising the step of:

forming concave portion in a glass surface of a glass substrate, by irradiating said glass surface of said glass substrate to be machined with a laser beam from above said glass substrate in a state that said laser beam is condensed at a point outside of said glass substrate;

wherein the concave portion in the glass substrate has a conical hole shape.

11. A method of forming a V-shaped groove in a glass surface of a glass substrate, comprising:

disposing the glass surface of the glass substrate below a beam-condensing point of a laser-beam; and irradiating said glass surface of said glass with said laser beam.

12. The method of claim 11, wherein the laser beam is a pulsed laser.

* * * * *